Patented Jan. 5, 1954

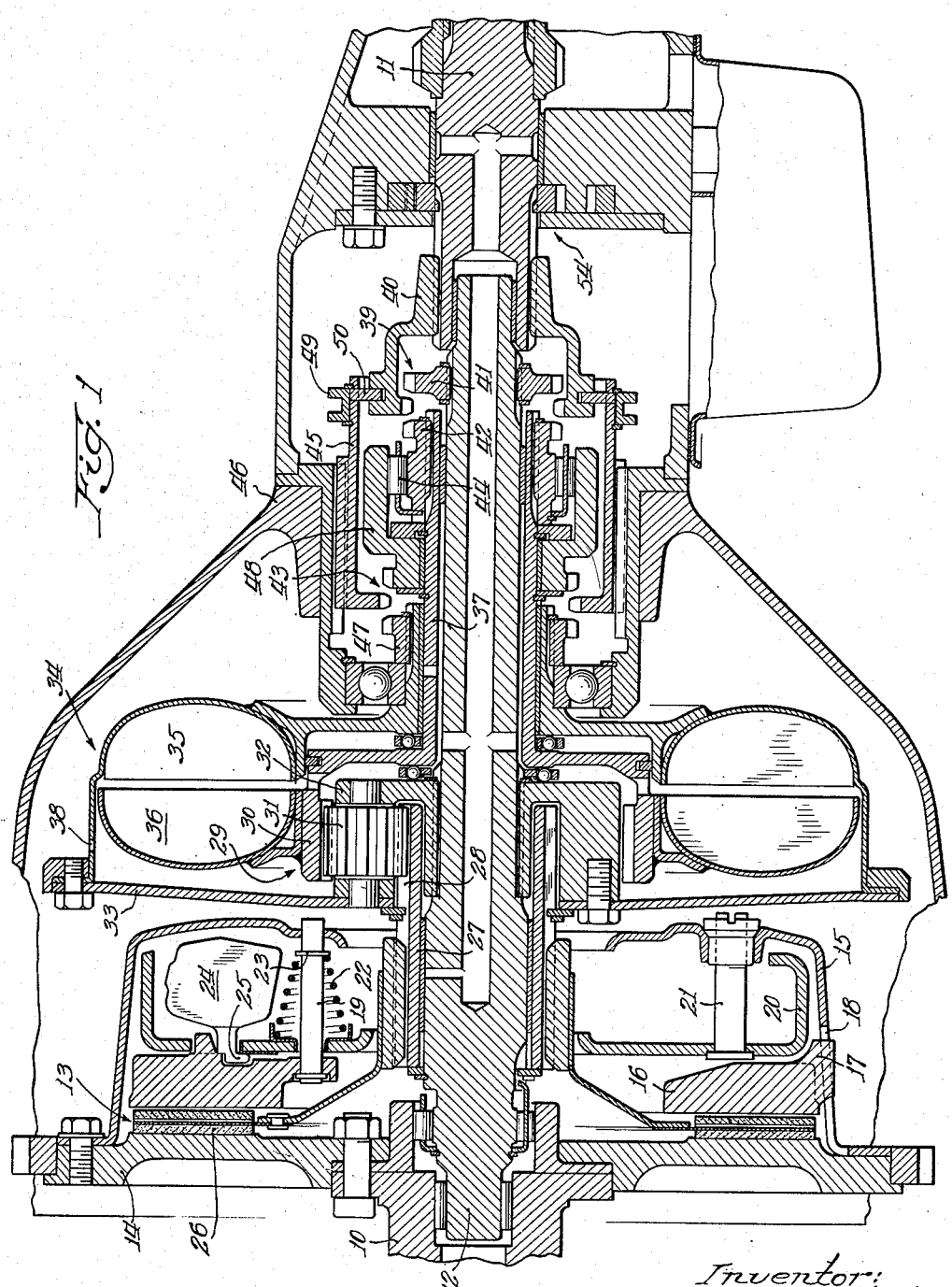

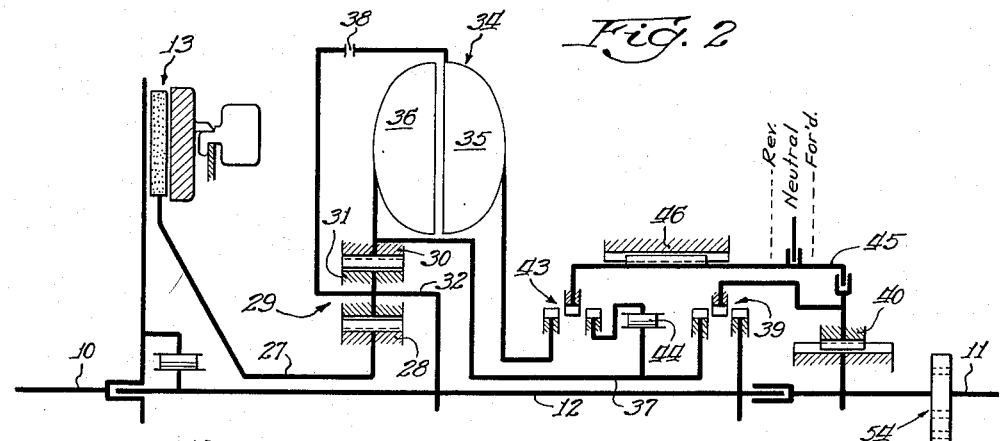
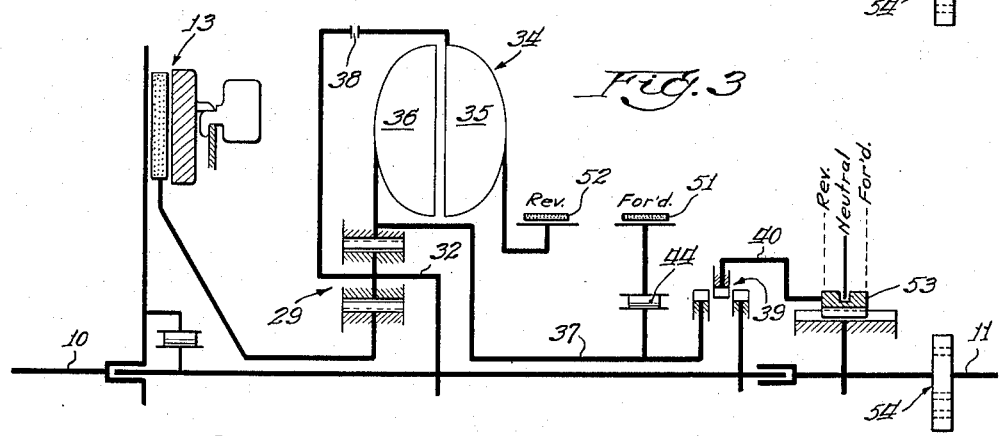
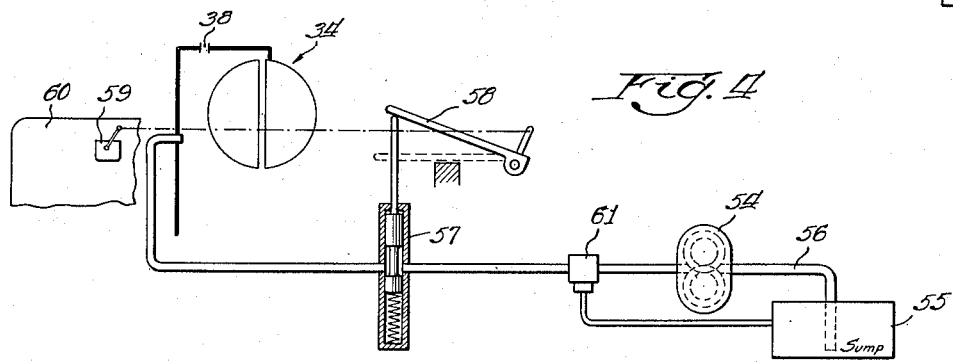

2,664,765

UNITED STATES PATENT OFFICE 2,664,765

TRANSMISSION AND CONTROL MECHANISM THEREFOR

Donald W. Kelbel, Muncie, Ind., assignor to Borg-Warner Corporation, Chicago, Ill., a corporation of Illinois Application June 9, 1944, Serial No. 539,443

36 Claims. (Cl. 74—645)

1

My invention relates to transmissions and control arrangements therefor and more particularly to such apparatus which is suitable for use in a motor driven vehicle.

It is an object of my invention to provide an improved transmission which provides a plurality of speed ratios and which is such that it shifts easily between the speed ratios. More particularly it is an object to provide an improved transmission which comprises a planetary gear set including sun, ring and planet gears, a one-way brake for an element of the gearing whereby the gearing provides a low speed ratio drive through the transmission, and a fluid coupling connected between the driven shaft of the transmission and an element of the planetary gearing for substantially locking up the gearing when the speed of the driven shaft has increased sufficiently whereby to provide a high speed ratio through the transmission. It is a further object of my invention to provide an improved transmission of this type which is such that a reverse drive may facilely be obtained through the transmission.

It is another object of my invention to provide an improved control arrangement for a transmission of this type which is such that the transmission may be easily downshifted from high speed ratio to low speed ratio under the control of the accelerator for the motor vehicle in which the transmission is installed. More particularly it is an object of my invention to provide in a transmission of this type a fluid coupling which has a discharge outlet in its casing for allowing a steady discharge of fluid out of the coupling, a pump for supplying fluid to the coupling to render it operative and a valve effectively between the pump and the fluid coupling under the control of the accelerator which functions to effectively disconnect the pump with respect to the fluid coupling when the accelerator is moved to its open throttle position so that the fluid coupling drains off fluid and is made ineffective whereby the low speed ratio becomes effective through the transmission.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a longitudinal sectional view of a transmission embodying the principles of the invention;

Fig. 2 is a diagrammatic illustration of the transmission shown in Fig. 1;

Fig. 3 is a diagrammatic illustration of another embodiment of the invention; and

2

Fig. 4 is a diagrammatic illustration of a control arrangement which may be used with either of the transmissions shown in Figs. 1 to 3.

Like characters of reference designate like parts in the several views.

Referring now to the drawings, the transmission illustrated in Figs. 1 and 2 comprises a drive shaft 10, a driven shaft 11, and an intermediate shaft 12 which is piloted in both of the shafts 10 and 11. The drive shaft 10 is connected with a centrifugal clutch 13, and the latter includes a fly-wheel 14 bolted to the shaft 10 which is of the ordinary type used in automotive vehicles. A casing portion 15 is fixed to the fly wheel 14, and a pressure plate 16 is disposed within the casing portion and is non-rotatably fixed with respect to the casing portion by means of tongues 17 on the pressure plate extending through slots 18 in the casing portion and by means of studs 19 fixed with respect to the pressure plate and extending through the casing portion. A disc-like member 20 is disposed within the casing portion 15 and is caused to rotate with the casing portion by the studs 19 extending through the member 20 and by means of other studs 21 carried by the member 20 and fixed to the casing portion. Springs 22 are disposed on the studs 19 and extend between the disc-like member 20 and collars 23 on the studs 19, and these springs function to yieldingly hold the pressure plate 16 at the limit of its movement away from the fly-wheel 14. Governor weights 24 are disposed within the disc-like member 20 and have stem portions 25 extending through the member 20 and into the pressure plate 16, and these stems are of such shape that they bear against the member 20 and move the pressure member 16 toward the fly-wheel 14 against the action of the springs 22 when the weights 24 move outwardly under the action of centrifugal force. It will be apparent that the weights 24 rotate along with the fly-wheel 14, due to their connection therewith by means of the disc-like member 20, the studs 19 and 21 and the casing portion 15, and the centrifugal force on the weights is due to this rotation. A clutch plate 26 is disposed between the pressure plate 16 and the fly-wheel 14 and is engaged therebetween to engage the clutch 13 when the weights 24 are moved outwardly by centrifugal force.

The clutch plate 26 is splined on a sleeve shaft 27 which is rotatably disposed on the intermediate shaft 12. The shaft 27 is formed with a sun gear 28 which forms a part of a planetary gear set 29. The gear set comprises also, in addition to the sun gear 28, a ring gear 30, a planet gear 31 in mesh with the ring and sun gear and a planet gear carrier 32. The planet gear carrier 32 is splined to the intermediate shaft 12 and also carries a housing portion 33 which constitutes a part of a fluid housing for a fluid coupling device 34. The coupling device 34 comprises an impeller or driving element 35 and a turbine or driven element 36. The driving element 35 is connected with the housing portion 33, and the driven element 36 is connected with the ring gear 30, as shown. The ring gear is also connected with a sleeve shaft 37 rotatably disposed on the intermediate shaft 12. The fluid coupling 34 is of the ordinary type in which the driven element 36 is rotated by the driving element 35 through the medium of fluid in the fluid housing for the vane elements. The fluid housing for the fluid coupling is provided with sharp edged orifices or openings 38 in its periphery which permit fluid within the fluid housing to discharge from the housing for purposes which will be hereinafter described.

A positive type clutch 39 is provided for alternatively connecting the driven shaft 11 with the intermediate shaft 12 or with the shaft 37. The clutch 39 comprises a toothed member 40 splined on the shaft 11 and adapted to move longitudinally of this shaft to interengage with a toothed member 41 splined on the shaft 12 or with a toothed member 42 splined on the shaft 37. A positive type brake 43 is provided for alternatively braking the driving element 35 of the fluid coupling 34 and thereby the planet gear carrier 32 or braking the shaft 37 through a one-way roller brake 44. The brake 43 comprises a toothed member 45 splined on the stationary casing 46 of the transmission and adapted to move to interengage with a toothed member 47 connected with the driving element 35 of the coupling 34 or to interengage with a toothed member 48 rotatably disposed on the shaft 37. The roller brake 44 is disposed between the member 48 and the member 42 and prevents reverse rotation of the member 42 and shaft 37 when the teeth of the members 45 and 48 are interengaged. The member 45 has a channeled collar 49 fixed on its periphery whereby it may be facilely moved longitudinally of the transmission as with use of a fork (not shown), and a member 50 is carried by the member 45 and extends inwardly into a suitable slot in the member 40, so that when the member 45 is moved, the member 40 is given corresponding movement. The arrangement of the members 40 and 45 is such that when the member 45 is moved to interengage with the member 48, the member 40 is simultaneously moved to interengage with the member 41; and when the member 45 is moved to interengage with the member 47, the member 40 is simultaneously moved to interengage with the member 42. The inter-connection between the members 40 and 45 thus functions to assure that when the shaft 12 is connected with the shaft 11 through the clutch 39, the shaft 37 is braked through the one-way roller brake 44 and the positive brake 43, and the interconnection furthermore assures that when the shaft 37 is connected with the shaft 11 through the positive clutch 39, the driving element 35 of the fluid coupling 34 is held stationary through the positive brake 43.

The transmission illustrated in Figs. 1 and 2 provides a low and a high speed ratio in forward drive between the shafts 10 and 11. When the member 45 is moved to connect the shafts 12 and 11 through the positive clutch 39 and to brake the shaft 37 through the one-way roller brake 44 and through the positive brake 43, the transmission is conditioned for forward drive. With the member 45 being so positioned, when the shaft 10 is rotated at a sufficiently high speed to engage the centrifugal clutch 13, the shaft 27 is driven through the clutch 13 to drive the sun gear 28, and the planet gear carrier 32 and thereby the shafts 12 and 11 are driven at a low speed ratio through the planetary gear set 29. In this case the ring gear 30 is held stationary by means of the brakes 44 and 43, and the ring gear forms the reaction point for the planetary gear set 29. As the speed of the planet gear carrier 32 increases, and assuming that the fluid coupling 34 is filled with fluid, driving element 35 of the coupling begins to drive the driven element 36 and thereby the ring gear 30, causing the one-way roller brake 44 to release. The planet gear carrier 32 and thereby the shafts 12 and 11 are thus rotated at a higher speed than at low speed drive with the one-way brake 44 engaged. As the speed of the shaft 11 increases, the speed of the driven element 36 approaches that of the driving element 35, and the fluid coupling 34 substantially locks up the planetary gear set 29 and causes the shaft 11 to be rotated at substantially the same speed as the shaft 10. The transmission is now in high speed forward drive.

When the member 45 is moved in the opposite direction to connect the shafts 37 and 11 through the clutch 39 and to brake the driving element 35 of the coupling 34 by means of the brake 43, the transmission is conditioned for reverse drive. In this case, the drive is from the centrifugal clutch 13, which is engaged after the shaft 10 has reached a sufficient speed, through the shaft 27 and the planetary gearing 29 to the shafts 37 and 11. The planet gear carrier 32 is held stationary by the brake 43, and the ring gear 30 and thereby the shaft 11 are rotated in reverse drive.

The embodiment of the invention shown diagrammatically in Fig. 3 is substantially the same as that shown in Figs. 1 and 2 with the exception that friction brakes are used in lieu of the positive brake 43. A band brake 51 is provided for acting in conjunction with the one-way roller brake 44 for braking the shaft 37, and a band brake 52 is provided for braking the planet gear carrier 32 through the driving element 35 of the fluid coupling 34. A channeled collar 53 is provided on the member 40 for allowing easy shifting of this member to position the clutch 39 in either of its two operative positions. This embodiment of the transmission operates in the same manner as the other embodiment with the exception that the brakes 51 and 52 must be engaged and disengaged properly with movement of the member 40, and this may be done by any suitable means (not shown).

The control arrangement shown diagrammatically in Fig. 4 may be used with either of the above described transmissions. The control arrangement comprises a pump 54 driven by the tail shaft 11 of either of the transmissions and connected at its intake side with a sump 55 by a fluid line 56. The pump 54 is of a fixed displacement type and is connected by the line 56 at its outlet side with the fluid coupling 34 in the transmission, and a valve 57 is provided in the line 56 effectively between the pump 54 and the fluid coupling. The accelerator 58 for the vehicle in which the transmission is installed, which is connected with the carburetor 59 of the motor 60 of the vehicle, is connected with the valve 57 to operate it. The connection with the valve is such that when the accelerator 58 is in any of its usual operating positions, the pump is effectively connected with the fluid coupling 34 to provide fluid pressure thereto; however, when the accelerator 58 is moved to its open throttle position at the lowermost limit of its movement, then the valve 57 closes the fluid line between the pump 54 and the fluid coupling 34 to prevent fluid being pumped to the fluid coupling. The discharge orifices or openings 38 in the fluid housing of the fluid coupling 34 allows the fluid in the housing to discharge therefrom so that the coupling 34 is substantially emptied of fluid on such a closing of the fluid line between the pump and fluid coupling, and there is thereafter no drive through the fluid coupling. Thus a depression of the accelerator 58 to its kickdown position functions to empty the fluid coupling 34 and to make it ineffective whereby the driven shaft 11 of the transmission is thereafter driven at low speed ratio through the planetary gearing 29 of the transmission. A relief valve 61 is preferably provided between the pump 54 and the fluid coupling 34 for relieving any excess fluid pressure in the fluid line 56, and the relief valve allows excess fluid to return to the sump 55. In the case in which the shaft 11 is driven in reverse drive, the pump 54 does not function to pump fluid into the coupling 34, and thus in reverse drive, the coupling 34 is always ineffective.

It will be seen that the pump 54 acts in conjunction with the orifices 38 to provide means for producing coupling of the fluid coupling 34 in accordance with the speed of rotation of one of the shafts in the transmission, in this instance the driven shaft 11. Until the speed of rotation of the driven shaft 11 reaches a value such that the pump volumetric output is more than adequate to fill the coupling regardless of the discharge through the orifices 38, the transmission will be in low speed ratio since the fluid supplied by the pump at a lower vehicle speed will be immediately discharged through the orifices so that the coupling will not become effective. The speed of filling of the coupling 34, after the critical speed has been reached, is dependent upon the speed of the pump and, hence, the speed of the driven shaft 11, so that a higher vehicle speed results in faster filling and faster engagement of the coupling. As a result, the pump 44 and the orifices 38 coact to provide smooth, graduated ratio changing upward, which ratio changing is thereby responsive to the speed of the driven shaft. It will be readily apparent that, when the vehicle is again slowed down below the critical speed, graduated, speed responsive ratio change downward will occur because the speed of the pump will become inadequate to maintain the coupling filled.

The cooperative effect of the pump 54 and the orifices 38 acts in conjunction with the inherent smooth coupling effect of the fluid coupling 34, as previously described, in order to provide very smooth ratio changes both from low to high and vice versa.

A further inherent beneficial effect is provided by the provision of the driven shaft pump 54 in conjunction with the fluid coupling 34. It is well known that an increase in fluid pressure in a hydrodynamic device will enable the hydrodynamic device to transfer increased torque without cavitation and consequent excessive slippage. Thus, when the coupling is transmitting torque, an increase in speed of the driven shaft will cause an increase in output of the pump to provide an increased pressure in the coupling due to increased volumetric pump discharge through the orifices 38. Briefly, since the torque transmitting capacity of the coupling increases as the fluid pressure increases, then an increase in pump speed will cause an increased coupling effect.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a transmission, the combination of a drive shaft, a driven shaft, a planetary gear set comprising a sun gear, a ring gear, a planet gear in mesh with said sun and ring gears, and a planet gear carrier, a clutch for connecting said drive shaft with said sun gear, a clutch for alternatively connecting said driven shaft with said planet gear carrier or with said ring gear, a one-way brake for said ring gear, a brake for said planet gear carrier, said one-way brake completing a forward drive in a low-speed ratio through said gear set from said drive shaft to said driven shaft when said second named clutch is operative to connect said planet gear carrier and said driven shaft, and a fluid coupling having a driving element connected with said planet gear carrier and having a driven element connected with said ring gear for substantially locking up the gear set and providing a high speed ratio in forward drive between said shafts when said second named clutch is operative to connect said planet gear carrier and said driven shaft, said brake for said planet gear carrier being effective to provide a reverse drive from said drive shaft to said driven shaft when said second named clutch is operative to connect said ring gear with said driven shaft.

2. In a transmission, the combination of a drive shaft, a driven shaft, a planetary gear set comprising a sun gear, a ring gear, a planet gear in mesh with said sun and ring gears, and a planet gear carrier, a clutch for connecting said drive shaft with said sun gear, a positive type clutch for alternatively connecting said driven shaft with said planet gear carrier or with said ring gear, a one-way brake for said ring gear, a movable positive brake element for alternatively rendering said one-way brake effective or for braking said planet gear carrier, a fluid coupling having a driving element connected with said planet gear carrier and having a driven element connected with said ring gear, said one-way brake when effective completing a low speed forward drive through said planetary gear set from said drive shaft to said driven shaft and said fluid coupling substantially locking up said planetary gear set whereby the one-way brake overruns to provide a high speed forward drive between said shafts when said positive clutch is effective to connect said planetary gear carrier and said driven shaft, said brake element for said planet gear carrier when effective providing a reverse drive from said drive shaft to said driven shaft when said positive clutch is effective to connect said ring gear with said driven shaft, and a control member for simultaneously controlling said brake element and said positive clutch whereby said one-way brake is effective when the positive clutch connects the planet gear carrier with said driven shaft and whereby said brake element is effective to arrest said planet gear carrier when the positive clutch connects said ring gear and said driven shaft.

3. In a motor vehicle, the combination of a vehicle motor, an accelerator for said motor, a transmission having a drive shaft and a driven shaft, said transmission including a planetary gear set adapted to provide a low speed ratio drive between said shafts, a one-way brake for completing said low speed ratio drive and means adapted to provide a high speed ratio drive between said shafts and including a fluid coupling connected between two of the elements of said planetary gear set to complete the high speed ratio drive, said fluid coupling having a fluid outlet for releasing the fluid in the device, a pump driven by said driven shaft for supplying fluid to said fluid coupling to render it operative, and a valve under the control of said accelerator for effectively disconnecting said fluid coupling from said pump when the accelerator is moved toward open throttle position whereby the fluid in said coupling device drains out through its said outlet to render the fluid coupling ineffective and to thereby downshift the transmission from high speed ratio to low speed ratio.

4. In a transmission, the combination of a drive shaft, a driven shaft, a planetary gear set comprising a sun gear element, a ring gear element, a planet gear in mesh with said sun and ring gear elements, and a planet gear carrier element, a clutch for connecting said drive shaft with one of said elements, a clutch for alternatively connecting said driven shaft with a second or a third of said elements, a one-way brake for said second element, a brake for said third element, said one-way brake completing a forward drive in a low speed ratio through said planetary gear set from said drive shaft to said driven shaft when said second named clutch is operative to connect said third element and said driven shaft, and a fluid coupling having a driving member connected with said third element and having a driven member connected with said second element for substantially locking up the gear set and providing a high speed ratio in forward drive between said shafts when said second-named clutch is operative to connect said third element and said driven shaft, said brake for said third element being effective to provide a reverse drive from said drive shaft to said driven shaft when said second-named clutch is operative to connect said second element with said driven shaft.

5. In a power transmission system, the combination of a drive element, a driven element, means for completing a power train between said elements, and means for providing graduated completion of said power train in accordance with the speed of one of said elements, said second named means including a pump driven by said one element connected to deliver the pump output to said first named means and means providing a sharp edged orifice in continuous communication with said pump for the relief of said pump output throughout the completion of said power train.

6. In a power transmission system, the combination of a drive element, a driven element, fluid actuated means for completing a power train between said elements, and means for providing a source of fluid to actuate said first named means whose volume increases in accordance with the speed of one of said elements, said second named means including a pump driven by said one element connected to deliver the pump output to said first named means and means providing a sharp edged orifice in continuous communication with said pump for the relief of said pump output throughout the completion of said power train, said pump being in continuous communication with said orifice from the initiation of movement of said one element up to the completion of said power train whereby the initiation of completion of said power train is responsive to the speed of said one element.

7. In a power transmission system, the combination of a drive element, a driven element, means providing a power train between said elements and including a hydrodynamic device for completing the power train, and means for providing a graduated fluid pressure on said hydrodynamic device in accordance with the speed of said driven element, said last mentioned means including a positive displacement pump driven by one of said elements and arranged to provide a pump output which increases with increase in speed of said one element, said pump being connected to deliver the pump output to said hydrodynamic device.

8. In a power transmission system, the combination of a drive element, a driven element, means providing a power train between said elements and including a hydrodynamic device for completing the power train, and means for providing a graduated fluid pressure on said hydrodynamic device in accordance with the speed of said driven element, said last mentioned means including a pump driven by one of said elements connected to deliver the pump output to said hydrodynamic device.

9. In a power transmission system, the combination of a drive shaft, a driven shaft, means providing a power train between said shafts and including a hydrodynamic device having a drive element and a driven element for completing the power train, said hydrodynamic device having one of said elements connected to rotate with one of said shafts, and a pump driven by said one shaft connected to deliver the pump output to said hydrodynamic device, said one element and said pump as they increase in speed with said one shaft providing increased coupling of said hydrodynamic device as the speed of said one shaft increases.

10. In a power transmission system, the combination of a drive shaft, a driven shaft, means providing a power train between said shafts and including a hydrodynamic device having a drive element and a driven element for completing the power train, said hydrodynamic device having one of said elements connected to rotate with one of said shafts, a pump driven by said one shaft connected to deliver the pump output to said hydrodynamic device, and means providing a restricted orifice for the relief of said pump output, said one element and said pump relieved in pressure by said orifice as the element and pump increase in speed providing increased coupling of said hydrodynamic device as the speed of said one shaft increases.

11. In power transmission mechanism, the combination of a drive shaft, a driven shaft, means for providing low and high speed drives between said shafts, means subject to changes in fluid volumetric output for changing the drive from said low speed drive to said high speed drive in response to increases in fluid volumetric output and for changing the drive from said high speed drive back again to said low speed drive in response to decreases in fluid volumetric output, a pump for supplying fluid and having a fluid outlet and driven by one of said shafts, means forming an orifice continuously connected with the outlet of said pump in both of said speed drives for relieving the fluid output supplied by said pump, and means for connecting the outlet of said pump with said drive changing means whereby the drive changing means causes a change from said low speed drive to said high speed drive in response to an increase in fluid volumetric output on increasing speed of said one shaft and causes a change back again from said high speed drive to said low speed drive in response to a decrease in fluid volumetric output on decreasing speeds of said one shaft.

12. In power transmission mechanism, the combination of a drive shaft, a driven shaft, means for providing low and high speed drives between said shafts, means subject to changes in fluid volumetric output for changing the drive from said low speed drive to said high speed drive in response to increases in fluid volumetric output and for changing the drive from said high speed drive back again to said low speed drive in response to decreases in fluid volumetric output, a fixed displacement pump for supplying fluid and having a fluid inlet and a fluid outlet and driven by said driven shaft, means forming a fluid sump with which said inlet is connected, means forming an orifice continuously connected with the outlet of said pump in both of said speed drives and adapted to discharge into said sump for relieving the fluid output supplied by said pump and to decrease with decreases in speed of said driven shaft, and means for connecting the outlet of said pump with said drive changing means whereby the drive changing means causes a change from said low speed drive to said high speed drive in response to an increase in fluid volumetric output on increasing speeds of said driven shaft and causes a change back again from said high speed drive to said low speed drive in response to a decrease in fluid volumetric output on decreasing speeds of said driven shaft.

13. In power transmission mechanism, the combination of a drive shaft, a driven shaft, means for providing low and high speed drives between said shafts, means subject to changes in fluid volumetric output for changing the drive from said low speed drive to said high speed drive in response to increases in fluid volumetric output and for changing the drive from said high speed drive back again to said low speed drive in response to decreases in fluid volumetric output, a pump for supplying fluid and having a fluid outlet and driven by one of said shafts, means forming an orifice having sharp edges and continuously connected with the outlet of said pump in both of said speed drives for allowing fluid supplied by said pump to discharge therethrough, and means for connecting the outlet of said pump with said drive changing means whereby the drive changing means causes a change from said low speed drive to said high speed drive in response to an increase in fluid output on increasing speeds of said one shaft and causes a change back again from said high speed drive to said low speed drive in response to a decrease in fluid output on decreasing speeds of said one shaft.

14. In power transmission mechanism, the combination of a drive shaft, a driven shaft, means for providing low and high speed drives between said shafts and including a planetary gear set, means subject to changes in fluid volumetric output for changing the drive from said low speed drive to said high speed drive in response to increases in fluid volumetric output and for changing the drive from said high speed drive back again to said low speed drive in response to decreases in fluid volumetric output, a pump for supplying fluid and having a fluid outlet and driven by said driven shaft, means forming an orifice continuously connected with the outlet of said pump in both of said speed drives for relieving the fluid output supplied by said pump, and means for connecting the outlet of said pump with said drive changing means whereby the drive changing means causes a change from said low speed drive to said high speed drive in response to an increase in fluid volumetric output on increasing speeds of said driven shaft and causes a change back again from said high speed drive to a low speed drive in response to said decrease in fluid volumetric output on decreasing speeds of said driven shaft.

15. In an automotive vehicle having a driving motor, the combination of a throttle control for said motor, a drive shaft adapted to be driven by the driving motor, a driven shaft adapted to drive the vehicle, means for providing low and high speed drives between said shafts and including a planetary gear set, means subject to changes in fluid volumetric output for changing the drive from said low speed drive to said high speed drive in response to increases in fluid volumetric output and for changing the drive from said high speed drive back again to said low speed drive in response to decreases in fluid volumetric output, a pump for supplying fluid and having a fluid outlet and driven by said driven shaft, means forming an orifice continuously connected with the outlet of said pump in both of said speed drives for relieving the fluid output supplied by said pump, means for connecting the outlet of said pump with said drive changing means whereby the drive changing means causes a change from said low speed drive to said high speed drive in response to an increase in fluid volumetric output on increasing speeds of said driven shaft and causes a change back again from said high speed drive to said low speed drive in response to a decrease in fluid volumetric output on decreasing speeds of said driven shaft, and means including a valve under the control of said throttle control for causing a change from said high speed drive to said low speed drive when said throttle control is moved toward open throttle position.

16 In an automotive vehicle having a driving motor, the combination of a throttle control for said motor, a drive shaft adapted to be driven by the driving motor, a driven shaft adapted to drive the vehicle, means for providing low and high speed drives between said shafts, means subject to changes in fluid volumetric output for changing the drive from said low speed drive to said high speed drive in response to increases in fluid volumetric output and for changing the drive from said high speed drive back again to said low speed drive in response to decreases in fluid volumetric output, a pump for supplying fluid and having a fluid outlet and driven by one of said shafts, means forming an orifice continuously connected with the outlet of said pump in both of said speed drives for relieving the fluid output supplied by said pump, means for connecting the outlet of said pump with said drive changing means whereby the drive changing means causes a change from said low speed drive to said high speed drive in response to an increase in fluid volumetric output on increasing speed of said one shaft and causes a change back again from said high speed drive to said low speed drive in response to a decrease fluid volumetric output on decreasing speeds of said one shaft, and means under the control of said throttle control for causing a change from said high speed drive to said low speed drive when said throttle control is moved toward open throttle position.

17. In a transmission, the combination of a drive shaft, a driven shaft, means for providing a plurality of drive ratios between said shafts, fluid actuated means including a hydro-dynamic device adapted for changing the drive through the transmission from one of said drive ratios to a second drive ratio, means effective on said hydrodynamic device for causing a change in speed ratio at a time when one of said shafts reaches a predetermined speed and for causing graduated completion of said second drive ratio in accordance with the speed of said one shaft, said third named means including a pump driven by said one shaft connected for delivering the pump output to said hydrodynamic device, and a single orifice for controlling the relief of the pump output.

18. In a transmission, the combination of a drive shaft, a driven shaft, means for providing a plurality of drive ratios between said shafts, fluid actuated means adapted for changing the drive through the transmission from one of said drive ratios to a second drive ratio, and means effective on said fluid actuated means for causing a change in speed ratio at a time when said driven shaft reaches a predetermined speed and for causing graduated completion of said second drive ratio in accordance with the speed of said driven shaft, said third named means including a positive displacement pump driven by said driven shaft connected for delivering the pump output to said fluid actuated means and means providing a sharp edged orifice for continuously relieving said pump output in all of said drive ratios.

19. In a transmission, the combination of a drive shaft, a driven shaft, means for providing a plurality of power trains between said shafts and including a hydrodynamic device, said hydrodynamic device having a drive element and a driven element with one of said elements adapted for being connected to rotate with one of said shafts, and a positive displacement pump driven by said one shaft and arranged to provide a pump output which increases with increase in speed of said one shaft, said pump being connected for delivering the pump output to said hydrodynamic device, said element and said pump providing increased coupling of said hydrodynamic device as the speed of said one shaft increases.

20. In an automotive vehicle having a driving motor, the combination of a throttle control for said motor, a drive shaft adapted to be driven by the driving motor, a driven shaft adapted to drive the vehicle, means for providing a plurality of power trains between said shafts and including a hydrodynamic device, said hydrodynamic device having a drive element and a driven element with one of said elements adapted for being secured to one of said shafts, a positive displacement pump driven by said one shaft and arranged to provide a pump output which increases with increase in speed of said one shaft, said pump being connected for delivering the pump output to said hydrodynamic device, said one element and said pump providing increased coupling of said hydrodynamic device as the speed of said one shaft increases, and means under the control of said throttle control for causing a change to another power train when said throttle control is moved toward open throttle position.

21. In a transmission, the combination of a drive shaft, a driven shaft, means for providing a low speed drive ratio and a high speed drive ratio between said shafts, means for changing the drive through the transmission from one of said drive ratios to the other, and means effective on said drive changing means for causing a change in speed ratio according to the change in speed of one of said shafts and for causing graduated drive changing completion by said drive changing means in accordance with the speed of said one shaft, said third named means including a pump driven by said one shaft connected for delivering the pump output to said drive changing means and means providing a sharp edged orifice for continuously relieving said pump output in all of said drive ratios.

22. In a transmission, the combination of a drive shaft, a driven shaft, means for providing a plurality of drive ratios between said shafts, said means including a gear set for providing a relatively low speed drive and coupling means for coupling two elements of said gear set to provide a relatively high speed drive, and means effective on said coupling means for causing coupling thereof to effect a change in speel ratio from said low speed drive to said high speed drive at a time when one of said shafts reaches a predetermined speed and for causing coupling of said coupling means in a graduated manner in accordance with the speed of said one shaft, said third named means including a pump driven by said one shaft adapted for delivering the pump output to said coupling means and means providing a restricted orifice for the discharge of said pump output.

23. In a transmission, the combination of a drive shaft, a driven shaft, means independently operable to provide a low speed ratio between said shafts and a hydrodynamic device operable in conjunction with said first named means to provide a high speed ratio between said shafts, a pump driven by said driven shaft for supplying fluid to said hydrodynamic device, and means providing a restricted orifice for continuously relieving the output from said pump whereby said hydrodynamic device is rendered effective in accordance with the speed of said driven shaft, said pump and said orifice being arranged to render said hydrodynamic device ineffective when the speed of said driven shaft falls below a predetermined speed to cause a change to a lower speed ratio.

24. In an automotive vehicle having a driving motor, the combination of a throttle control for said motor, a drive shaft adapted to be driven by the driving motor, a driven shaft adapted to drive the vehicle, means independently operable to provide a low speed ratio between said shafts and fluid actuated means operable in conjunction with said first named means to provide a high speed ratio between said shafts, a pump driven by said driven shaft for supplying fluid to said second named means, means providing a sharp edged orifice for continuously relieving the output from said pump in all of said speed ratios whereby said second named means are rendered effective in accordance with the speed of said driven shaft, said pump and said orifice being arranged to render said second named means ineffective when the speed of said driven shaft falls below a predetermined speed to cause a change to said lower speed ratio, and means under the control of said throttle control for causing a change from said high speed ratio to said low speed ratio when said throttle control is moved toward open throttle position.

25. In a motor vehicle, the combination of a vehicle motor, an accelerator for said motor, a transmission having a drive shaft and a driven shaft, said transmission including gear means providing a low speed ratio drive between said shafts, means adapted to provide a high speed ratio drive between said shafts and including a hydrodynamic coupling device for completing said high speed ratio drive and having a restricted fluid outlet for the release of fluid in the coupling device, a source of fluid pressure operatively associated with one of said shafts for supplying fluid to the coupling device at a rate increasing with the speed of said one shaft for rendering the coupling device operative whereby ratio changing from said low speed drive to said high speed drive is effected responsive to the speed of said one shaft, and means under the control of said accelerator for effectively disconnecting the source of fluid pressure from said coupling device when said accelerator is moved toward open throttle position whereby the fluid in said coupling device drains out through its said outlet to render the coupling device inoperative and to thereby downshift the transmission from high speed ratio to low speed ratio.

26. In a motor vehicle, the combination of a vehicle motor, an accelerator for said motor, a transmission having a drive shaft and a driven shaft, said transmission including gear means providing a low speed ratio drive between said shafts and means adapted to provide a high speed ratio drive between said shafts and including a hydrodynamic coupling device for completing the high speed ratio drive, said coupling device having an outlet therein for releasing fluid in the device, a pump driven by one of said shafts for supplying fluid to said device at a rate increasing with the speed of said one shaft to render the coupling device operative whereby ratio changing from said low speed drive to said high speed drive is effected responsive to the speed of said one shaft, and a valve under the control of said accelerator for stopping the flow of fluid to said coupling device when said accelerator is moved toward open throttle position whereby the fluid in said coupling device drains out through its said outlet to render the coupling device inoperative and to thereby downshift the transmission from high speed ratio to low speed ratio.

27. In a motor vehicle, the combination of a vehicle motor, an accelerator for said motor, a transmission having a drive shaft and a driven shaft, said transmission including gear means providing a low speed ratio positive drive between said shafts and means providing a high speed ratio between said shafts, said last named means including a hydrodynamic coupling device, means including a source of fluid pressure operatively associated with one of said shafts for supplying fluid to the hydrodynamic device at a rate increasing with the speed of said one shaft for rendering the hydrodynamic device operative whereby ratio changing from said low speed ratio to said high speed ratio is effected responsive to the speed of said one shaft, and means under the control of said accelerator for rendering said coupling device ineffective when said accelerator is moved toward open throttle position and to thereby cause a downshift of the transmission from high speed ratio to low speed ratio.

28. In a motor vehicle, the combination of a vehicle motor, an accelerator for said motor, a transmission having a drive shaft and a driven shaft, said transmission comprising a planetary gear set including a sun gear element, a ring gear element, a planet gear element in mesh with said two elements, and a planet gear carrier element, said drive shaft being adapted to drive one of said gear elements and a second of said gear elements being adapted to drive said driven shaft, a one-way brake for the third of said gear elements for completing a drive in a low speed ratio through said gear set from said drive shaft to said driven shaft, a hydrodynamic coupling device connected between said second and third elements of the planetary gear set for substantially locking up the gear set and providing a high speed ratio between said shafts, means including a source of fluid pressure operatively associated with one of said shafts for supplying fluid to the hydrodynamic device at a rate increasing with the speed of said one shaft for rendering the hydrodynamic device operative whereby ratio changing from said low speed ratio to said high speed ratio is effected responsive to the speed of said one shaft, and means, including a member under the control of the accelerator, for rendering said device ineffective when the accelerator is moved toward open throttle position and to thereby downshift the transmission from high speed ratio to low speed ratio.

29. In a motor vehicle, the combination of a vehicle motor, an accelerator for said motor, a transmission having a drive shaft and a driven shaft, said transmission comprising a planetary gear set including a sun gear element, a ring gear element, a planet gear element in mesh with said two elements, and a planet gear carrier element, said drive shaft being adapted to drive one of said gear elements and a second of said gear elements being adapted to drive said driven shaft, a one-way brake for a third of said gear elements for completing a positive drive in a low speed ratio through said gear set from said drive shaft to said driven shaft, a hydrodynamic coupling device connected between said second and third elements of the planetary gear set for substantially locking up the gear set and providing a high speed ratio between said shafts, means including a pump driven by said driven shaft for supplying fluid to the hydrodynamic device at a rate increasing with the speed of said driven shaft for rendering the hydrodynamic device operative whereby ratio changing between said low ratio and said high ratio is effected responsive to the speed of the driven shaft, and means, including a member under the control of the accelerator, for rendering said hydrodynamic coupling device ineffective and to thereby downshift the transmission from high speed ratio to low speed ratio.

30. In a motor vehicle, the combination of a vehicle motor, an accelerator for said motor, a transmission having a drive shaft and a driven shaft, said transmission including a planetary gear set adapted to provide a low sped ratio positive drive between said shafts, a one-way brake for completing said low speed ratio drive, means adapted to provide a high speed ratio drive between said shafts and including a fluid coupling device connected between two of the elements of said planetary gear set to complete the high speed ratio drive, means including a pump driven by one of said shafts for supplying fluid to the coupling device for rendering it operative whereby ratio changing between said low speed drive and said high speed drive is effected responsive to the speed of said one shaft, and means under the control of said accelerator for rendering said device ineffective and to thereby downshift the transmission from high speed ratio to low speed ratio.

31. In a motor vehicle, the combination of a vehicle motor, an accelerator for said motor, a transmission having a drive shaft and a driven shaft, means connected between said shafts and adapted to provide a low speed ratio positive drive, means including said first-named means and a hydrodynamic coupling device connected thereto adapted to provide a high sped ratio between said shafts, means including a positive displacement pump driven by said driven shaft for supplying fluid to the hydrodynamic device for rendering it operative whereby ratio changing between the low speed ratio and the high speed ratio is effected responsive to the speed of said driven shaft, and means under the control of said accelerator for rendering said device ineffective and to thereby downshift the transmission from high speed ratio to low speed ratio.

32. In a motor vehicle, the combination of a vehicle motor, an accelerator for said motor, a transmission having a drive shaft and a driven shaft, said transmission comprising means providing a low speed ratio between said shafts and means adapted to provide a high speed ratio between said shafts, one of said means including a hydrodynamic coupling device, the other of said means providing a positive drive, means including a source of fluid pressure operatively associated with one of said shafts for supplying fluid to the hydrodynamic device at a rate increasing with the speed of said one shaft for rendering the device operative whereby ratio changing between said low ratio and said high ratio is effected responsive to the speed of said one shaft, and means under the control of said accelerator for rendering said hydrodynamic device ineffective when said accelerator is given an operative stroke to thereby shift the transmission from one speed ratio to the other speed ratio.

33. In a motor vehicle, the combination of a vehicle motor, an accelerator for said motor, a transmission having a drive shaft and a driven shaft, said transmission comprising means providing a low speed ratio between said shafts and means adapted to provide a high speed ratio between said shafts, one of said means including a hydrodynamic coupling device, the other of said means comprising essentially gearing and providing a positive drive, means including a positive displacement pump driven by said driven shaft for supplying fluid to the hydrodynamic device for rendering it operative whereby ratio changing from said low ratio to said high ratio is effected responsive to the speed of said one shaft, and means under the control of said accelerator for rendering said hydrodynamic device effective when said accelerator is given an operative stroke to thereby shift the transmission from one speed ratio to the other speed ratio.

34. In a power transmission system, the combination of a drive element, a driven element, means for completing a power train between said elements, and means for providing graduated completion of said power train in accordance with the speed of said driven element, said second named means including a positive displacement pump driven by said driven element and arranged to provide a pump output which increases with increase in speed of said driven element, said pump being connected to deliver the pump output to said first named means, said second named means further including means providing a sharp edged orifice in continuous communication with said pump for the relief of said pump output throughout the completion of said power train.

35. In a power transmission system, the combination of a drive element, a driven element, fluid pressure responsive means for completing a power train between said elements, and means for providing a fluid pressure to said first named means that increases in accordance with the speed of said driven element, said second named means including a positive displacement pump driven by said driven element and arranged to provide a pump output which increased with increase in speed of said driven element, said pump being connected to deliver the pump output to said first named means, said second named means further including means providing a sharp edged orifice for the relief of said pump output, said pump being in continuous communication with said orifice from the initiation of movement of said driven element up to the completion of said power train whereby the completion of said power train is responsive to the speed of said driven element.

36. In a power transmission system, the combination of a drive shaft, a driven shaft, means providing a power train between said shafts and including a hydrodynamic device having a drive element and a driven element for completing the power train, said hydrodynamic device having one of said elements connected to rotate with one of said shafts, and a positive displacement pump driven by said one shaft and arranged to provide a pump output which increases with increase in speed of said one element, said pump being connected to deliver the pump output to said hydrodynamic device, said one element and said pump as they increase in speed with said one shaft providing increased coupling of said hydrodynamic device as the speed of said one shaft increases.

DONALD W. KELBEL.

References Cited in the file of this patent

UNITED STATES PATENTS

| Number | Name | Date |
|---|---|---|
| 2,014,944 | Martyrer | Sept. 17, 1935 |
| 2,018,616 | Martyrer | Oct. 22, 1935 |
| 2,024,842 | Bauer | Dec. 17, 1935 |
| 2,063,471 | Stedefield | Dec. 8, 1936 |
| 2,081,863 | Duffield | May 25, 1937 |
| 2,131,619 | Duffield | Sept. 27, 1938 |
| 2,150,151 | Burrows | Mar. 14, 1939 |
| 2,224,884 | Schneider | Dec. 17, 1940 |
| 2,301,451 | Pollard | Nov. 10, 1942 |
| 2,312,849 | Pollard | Mar. 2, 1943 |
| 2,314,554 | Pennington | Mar. 23, 1943 |
| 2,352,004 | Pollard | June 20, 1944 |
| 2,377,851 | Blank | June 12, 1945 |
| 2,402,248 | Hale | June 18, 1946 |
| 2,437,333 | Pollard | Mar. 9, 1948 |